Oct. 12, 1943.  C. W. LAWMAN ET AL  2,331,483
STORAGE TANK
Filed May 31, 1940  4 Sheets-Sheet 1

Charles William Lawman
Alexander Ronald Miller
Inventors
by Frank T. Wentworth
their Attorney.

Patented Oct. 12, 1943

2,331,483

UNITED STATES PATENT OFFICE 2,331,483

STORAGE TANK

Charles William Lawman, Motherwell, and Alexander Ronald Miller, Bridge-of-Weir, Scotland Application May 31, 1940, Serial No. 338,122
In Great Britain June 16, 1939

5 Claims. (Cl. 220—1)

This invention relates to the construction of storage tanks and is particularly applicable to tanks intended for the underground storage of motor spirits and other petroleum products. It may, however, be applied to the construction of storage tanks above ground level and the tanks may, of course, be used for the storage of any liquid.

In accordance with the invention the side walls and the roof of a storage tank are formed of corrugated steel in the form of pressed steel troughing. The section and thickness of this troughing are chosen in accordance with the loads and pressures (including gas pressures) to be resisted, these being dependent upon the size, shape and depth of each individual tank and the nature of the liquid to be stored. In tanks which are of great depth, or are located at a great depth below ground, intermediate horizontal stringers may be provided to distribute the side pressure on the walls of the tank and in the case of circular tanks the horizontal stringers may be in the form of circular bands to resist hoop tension.

The floor of the tank may be of flat steel plates and the internal construction of the tank may be similar to that of known underground storage tanks, the roof being carried on steel joists supported on suitably spaced columns. The tank may be of electrically welded construction throughout, except for bolted connections of the columns, carrier joists and roof troughing, or riveted connections may be employed instead of welding, or mixed methods of construction may be adopted. The tank is built up in great part from large numbers of identical units, thus greatly simplifying construction.

Figure 1:
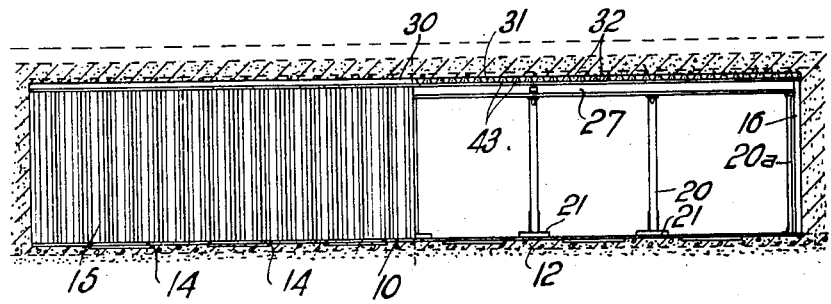
Figure 2:
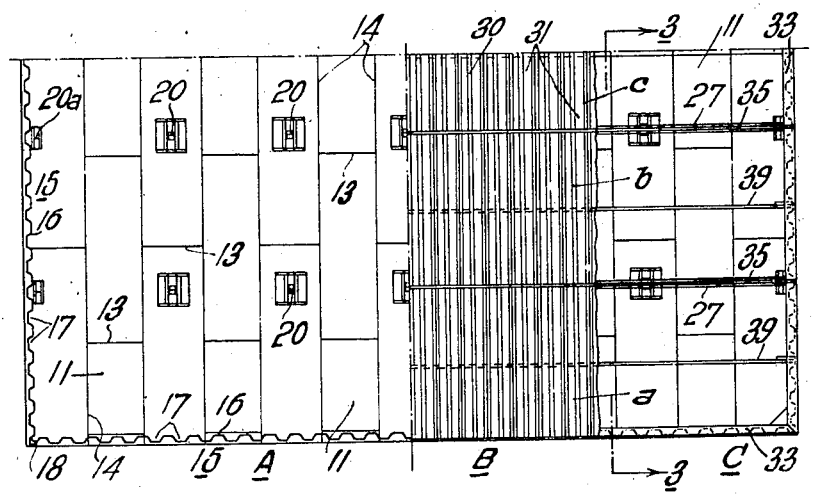
Figure 3:
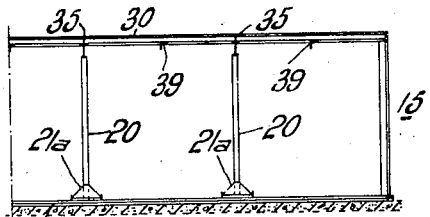
Figure 4:
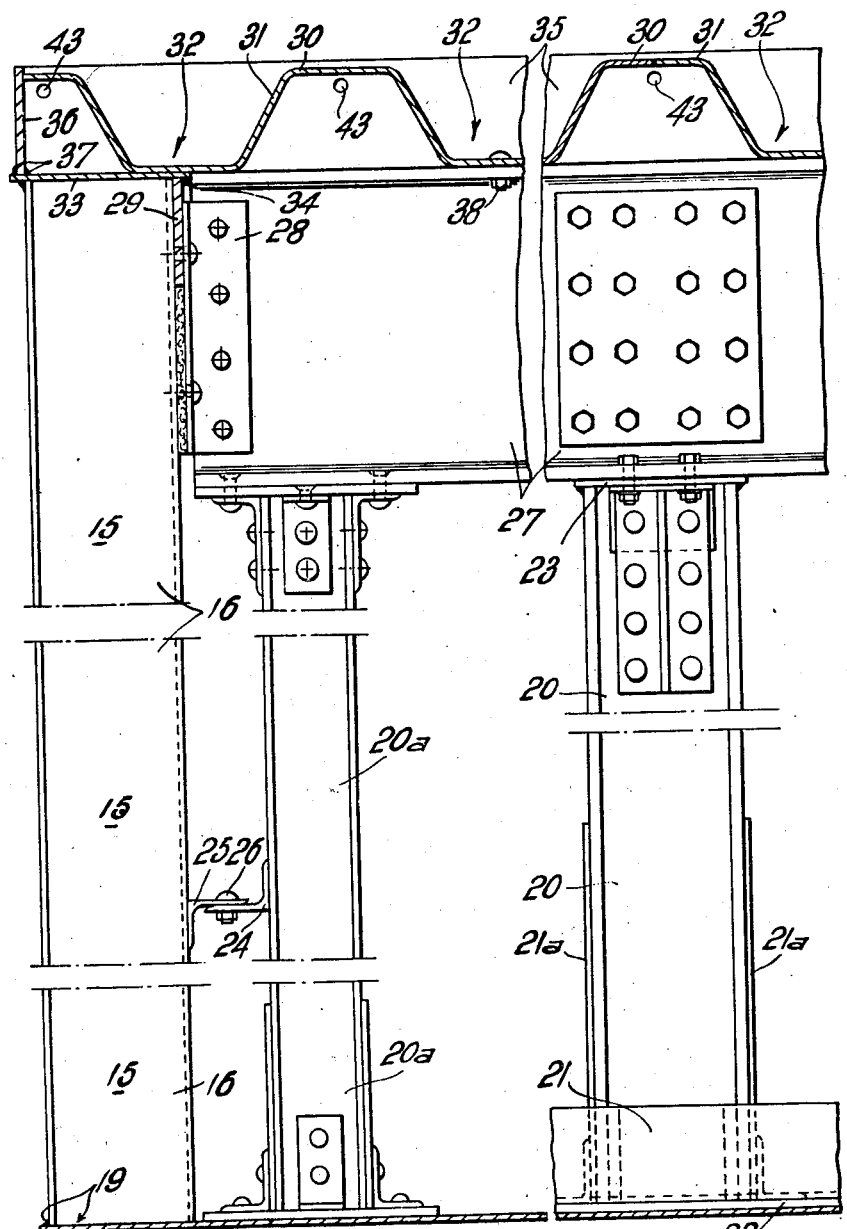
Figure 5:
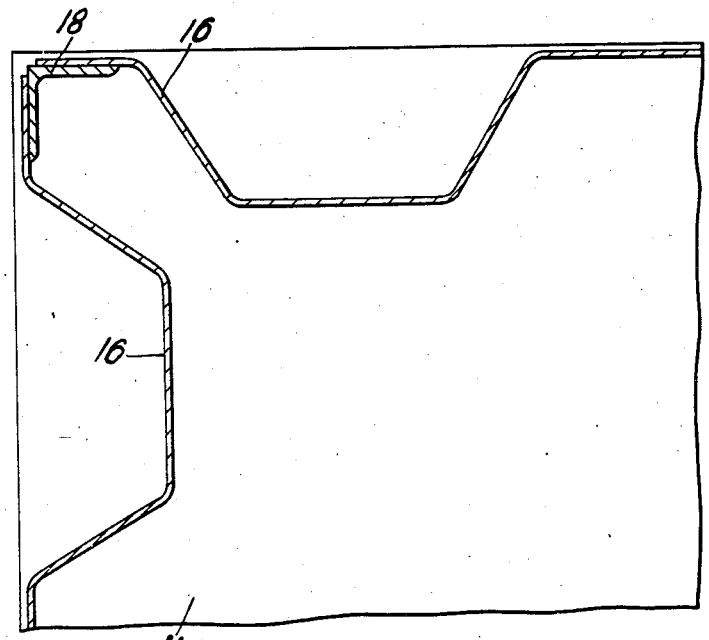
Figure 6:
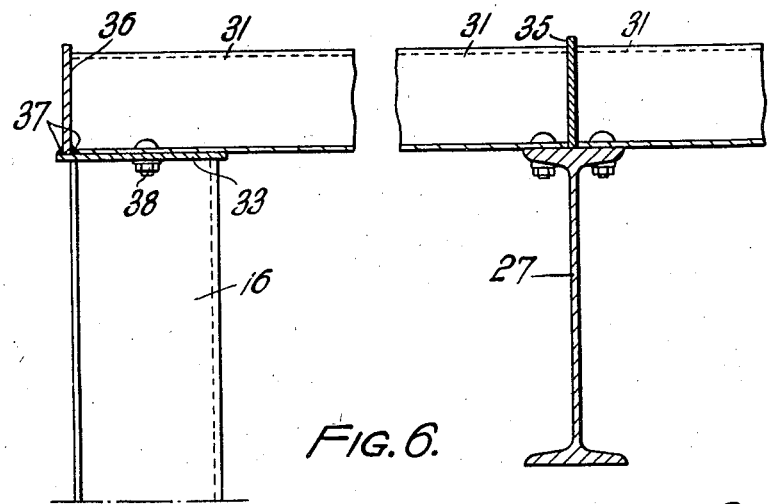
Figure 7:
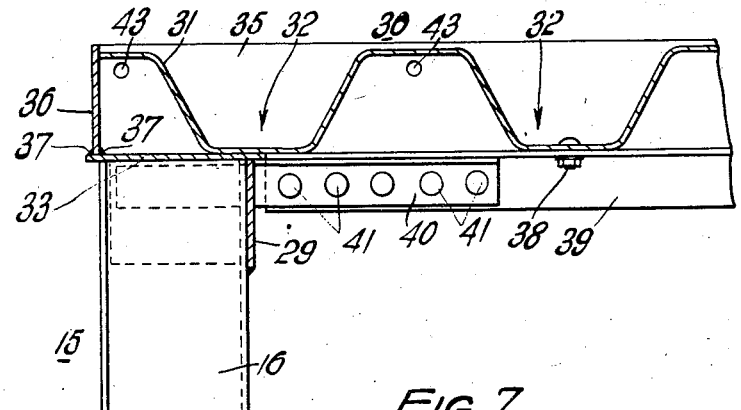
Figure 8:
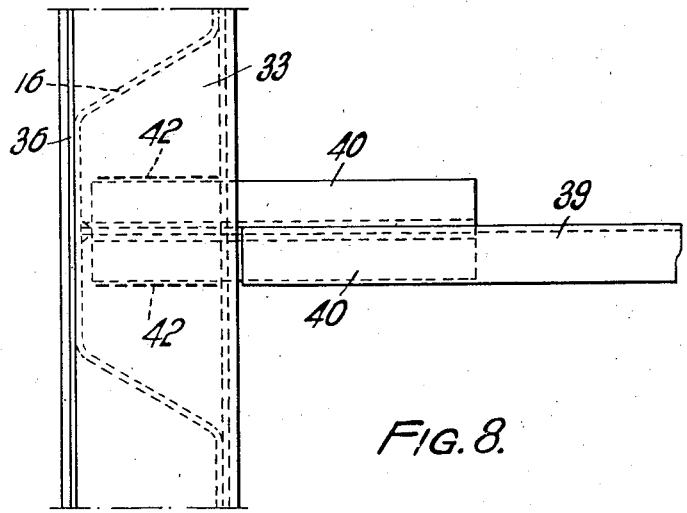

One particular embodiment of the invention will now be more particularly described, by way of example, with reference to the accompanying drawings, in which Figure 1 is a half elevation, half vertical section of a rectangular underground tank for the storage of motor spirit, Figure 2 is a half plan of the tank shown in Figure 1 and comprises a part plan of the floor at A, a part plan of the roof at B and a part plan with the roof troughing removed at C, Figure 3 is a vertical section on the line 3—3 of Figure 2, Figure 4 is a part sectional elevation on a considerably larger scale showing two of the columns and part of the joist carried thereby, Figure 5 is a detail view in horizontal section showing the method of forming the corners of the tank, Figure 6 is a detail of a side edge of the roof troughing and a division plate referred to hereinafter, and Figures 7 and 8 are part sectional elevation and plan view respectively showing a tie bar also referred to in the following description.

The rectangular underground tank shown in the drawings measures 100 feet square by 20 feet in height and has its floor 10 formed of flat plates 11 of ⅜ inch steel resting on a flat concrete raft 12. The plates 11 are butt welded at 13 to form strips extending across the width of the tank and these strips are lap welded together at 14 to form a continuous floor. Alternatively the plates 11 may be lap welded at 13 and the strips butt welded at 14. The side walls 15 of the tank are formed of ⅜ inch pressed steel troughing 16 having vertical corrugations 17 of channel shape 9 inches deep. The troughing 16 is in strips extending the full height of the tank and secured together at their side edges by butt welding. At the four corners of the tank the troughing is welded to vertical angle section strips 18 as shown in Figures 2 and 5. The side walls 15 rest on the floor plating 11 and are secured to it by welding, as shown at 19 in Figure 4.

Four parallel rows of steel columns 20 are provided for the support of the roof, two of such rows being shown in Figure 2. The rows are 20 feet apart and each comprises two end columns 20a closely adjacent to the opposite side walls of the tank and five main columns 20 disposed intermediately at equal intervals. The main columns 20 are of I section 10 inches by 8. At their lower ends they are supported between the vertical flanges 21a of angle sections 21 secured to a half inch steel base plate 22 4 feet square and at their upper ends they carry a cap plate 23 of ⅜ inch steel measuring 11 inches by 8. The end columns 20a are of similar but less massive construction and may be tied to the side walls 15 of the tank, as shown in Figure 4, by bolting together at 26 a pair of angle section members 24 and 25 welded to the column 20a and to the tank wall 15, respectively. Each row of columns supports a steel joist 27 of I section measuring 20 inches by 6½ inches which is bolted to the cap plates 23 of the columns. The ends of these joists are secured to the side walls of the tank by angle sections 28 bolted to the webs of the joists and to ⅜ inch plates 29, bolted to the inner face of the steel troughing 16 of the walls.

The roof 30 of the tank is formed by pressed steel troughing 31, similar to that used for the side walls 15, but only ¼ inch thick and with corrugations 32 only 6 inches deep. Strips of the troughing, each 20 feet in length, are again secured side by side by lap or butt welding. The roof troughing 31 is supported upon the four I section joists 27 and upon horizontal closing plates 33 welded at 34 to the top of the steel troughing 16 forming the side walls (Figure 4). The five 20 foot spans of roof troughing a, b, c ... (Figure 2) are connected together by welding their ends to opposite sides of vertically disposed ¼ inch steel division plates 35 some 7 inches high, each of these plates overlying one of the supporting joists 27, as clearly shown in Figures 2, 3, 4 and 6. The side edges of the roof troughing 31 and the outer ends of the two outside spans a and e are similarly welded to vertically disposed ⅜ inch steel plates 36 some 7 inches high, whose lower edges are welded at 37 to the outer edges of the side wall cover plates 33. The roof troughing 31 is bolted at every corrugation, as shown at 38 in Figure 4, to the I section joists 27 and is similarly secured to angle section ties 39 (Figures 2, 7 and 8) disposed at the centre of each roof span. The ties 39 extend between opposite side walls 15 of the tank to which they are secured by angle cleats 40 bolted to the ties at 41 and welded to the underside of the cover plates 33 at 42. Gas holes 43 are provided in the plates 35 as shown in Figures 1 and 4. The completed roof is covered with a six inch layer of concrete and with a layer of earth, as indicated in Figure 1.

It will be understood that the invention is in no way limited to the particular example described above, the general principles of construction being applicable to storage tanks of the most varied shapes and sizes.

What we claim and desire to secure by Letters Patent is:

1. A storage tank comprising a shell having a roof formed of strips of troughing formed of corrugated pressed steel secured side by side by having their edges extending parallel with the corrugations, welded together to form a span, a floor, parallel rows of columns within said tank, a joist secured to the top of each row of columns, a steel plate extending along and projecting upwardly from each joist at right angles to the corrugations in the roof troughing, each strip of troughing in the roof having its edge adjacent the ends of said corrugations welded to said vertically extending plate, a side wall formed of corrugated steel in the form of pressed steel troughing having vertically extending corrugations, and means whereby the edges of said roof are secured to, and supported from, the top of said side walls.

2. A storage tank comprising a shell having a roof formed of strips of troughing formed of corrugated pressed steel secured side by side by having their edges extending parallel with their corrugations welded together to form a span, a floor, parallel rows of columns within said tank, a joist secured to the top of each row of columns, a steel plate extending along and projecting upwardly from each joist at right angles to the corrugations in the roof troughing, each strip of troughing in the roof having its edge adjacent the ends of said corrugations welded to said vertically extending plate, and the bottom of the corrugations of the strips of troughing forming the roof being secured directly to the joists adjacent said vertically extending plates, a side wall formed of corrugated steel in the form of pressed steel troughing and means whereby the edges of said roof are secured to, and supported from, the top of said side walls.

3. A storage tank comprising a shell having a roof formed of strips of troughing formed of corrugated pressed steel secured side by side by having their edges extending parallel with the corrugations, welded together to form a span, a floor, parallel rows of columns within said tank, a joist secured to the top of each row of columns, a steel plate extending along and projecting upwardly from each joist, each strip of troughing in the roof having its edge adjacent the ends of said corrugations welded to said vertically extending plate, side walls formed of pressed steel troughing having vertically extending corrugations, horizontally extending closing plates surmounting the steel troughing in said side wall, and vertically disposed plates secured to the outer edges of said last named plates, the edge of contiguous strips of troughing in the roof extending parallel with the corrugations being secured to said last named vertically disposed plate.

4. A storage tank comprising a shell having a roof formed of strips of troughing formed of corrugated pressed steel secured side by side by having their edges extending parallel with the corrugations welded together to form a span, a floor, parallel rows of columns within said tank, a joist secured to the top of each row of columns, a steel plate extending along and projecting upwardly from each joist at right angles to the corrugations in the roof troughing, each strip of troughing in the roof having its edge adjacent the ends of said corrugations welded to said vertically extending plate a tie member extending at right angles to the corrugations of the roof troughing, parallel with said joist, positioned along substantially the center of each strip and secured thereto, and the bottom of the corrugations of the strips of troughing forming the roof being secured directly to the joists intermediate said vertically extending plates, side walls formed of corrugated steel in the form of pressed steel troughing having vertically extending corrugations, and means whereby the edges of said roof are secured to, and supported from, the top of said side walls.

5. A storage tank comprising a shell having a rectangular metal floor, vertically extending angle metal strips at each corner of said floor, side walls each composed of vertically extending strips of pressed steel troughing having vertically extending corrugations, adjacent strips of said side walls having the edges extending parallel with the corrugations connected together and the edge portions extending parallel with the corrugations of the end strips of each side wall being connected with said angle metal strips, a roof formed of corrugated steel in the form of pressed steel troughing, means whereby the edges of said roof are connected with and supported from said side walls, and parallel rows of columns within said side walls and co-operating therewith to support said roof, the end column of each row being contiguous to and connected with the pressed steel troughing of a side wall.

CHARLES WM. LAWMAN.
ALEXANDER R. MILLER.